US006905002B2

(12) United States Patent

Bagga et al.

(10) Patent No.: US 6,905,002 B2

(45) Date of Patent: Jun. 14, 2005

(54) ACOUSTIC WAVE ATTENUATOR FOR A RAIL

(75) Inventors: Kalyan Singh Bagga, Northville, MI (US); Xilin Yang, Streamworld, IL (US); Kenneth R. Seymour, II, Villa Park, IL (US); W. Bryan Snyder, Hanover Park, IL (US); Sidi Ould Sadfa, Chicago, IL (US); Ning Lei, Oak Brook, IL (US); James H. Yager, St. Charles, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/177,195

(22) Filed: Jun. 21, 2002

(65) Prior Publication Data

US 2003/0234138 A1 Dec. 25, 2003

(51) Int. Cl.[7] .......................... F16L 47/02; F16K 55/02; F01N 1/08; F02M 55/04

(52) U.S. Cl. ....................... 181/233; 181/249; 181/269; 181/272; 181/255; 123/456; 123/467

(58) Field of Search ................................ 123/456, 467, 123/205, 294, 445, 465; 181/233, 232, 217, 234, 249, 250, 255, 266, 269, 272, 273, 276; 138/30, 37, 40, 41, 44

(56) References Cited

U.S. PATENT DOCUMENTS 2,147,311 A * 2/1939 Nash .......................... 181/233
2,437,446 A * 3/1948 Stephens .................... 181/276
2,707,033 A * 4/1955 Moerke et al. ............. 181/273
4,514,151 A * 4/1985 Anders et al. .............. 181/233
5,002,021 A * 3/1991 Nakata et al. ......... 123/184.42
5,373,824 A 12/1994 Peters et al.
5,528,924 A * 6/1996 Wajid et al. ............... 73/24.06
6,053,712 A * 4/2000 Konishi et al. ............... 138/30
6,119,728 A * 9/2000 Seidel-Peschmann et al. ... 138/26
6,213,096 B1 * 4/2001 Kato et al. .................. 123/456
6,401,691 B1 * 6/2002 Kawano et al. ............. 123/456
6,470,859 B2 * 10/2002 Imura et al. ................ 123/467

FOREIGN PATENT DOCUMENTS

JP 2000192872 A * 7/2000 .......... F02M/55/02

* cited by examiner

*Primary Examiner*—Edgardo San Martin
(74) *Attorney, Agent, or Firm*—Dennis Kelly Sullivan; Susan L. Lukasik; Jeffrey P. Calfa

(57) ABSTRACT

An actuator rail assembly for conveying an actuating fluid under pressure to at least one fuel injector, include an elongate fluid passageway being defined in a rail. A fluid inlet port is in fluid communication with the fluid passageway, the inlet port being fluidly couplable to a source of actuating fluid under pressure. A respective fluid outlet port is associated with each respective fuel injector and being fluidly couplable thereto for conveying actuating fluid to the respective fuel injector; and at least one fluid cavity having at least one throttling orifice, the orifice effecting fluid communication between the fluid cavity and the fluid passageway. An acoustic wave attenuator and a method of attenuation are also included.

2 Claims, 7 Drawing Sheets

ACOUSTIC WAVE ATTENUATOR FOR A RAIL

TECHNICAL FIELD

The present invention relates to high pressure fluid rails for internal combustion engines. More particularly, the present invention relates to acoustic wave attenuation for such rails.

BACKGROUND OF THE INVENTION

Electronically controlled, hydraulically actuated (HEUI) fuel injection systems use an actuating fluid (the actuating fluid preferably being engine lubricating oil, but other fluids are acceptable) rail to provide actuation actuating fluid to each injector for generating high pressure fuel for the injection process. The actuating fluid rail typically has its actuating fluid supply provided by a high-pressure actuating fluid pump driven by the engine drive shaft. The pressure in the actuating fluid rail is typically controlled by a rail pressure control valve (RPCV), which determines the actuating fluid pressure in the rail depending on engine operating conditions.

Each injector has an actuating fluid control valve that is electronically controlled to control the time and amount of the actuating fluid flowing into the injector. The actuating fluid control valve initiates and terminates the injection process.

V-form engines typically have a separate rail servicing each of the two banks of cylinders. At the actuating fluid flow inlet of each rail, there may be a check valve in place to isolate the fluid communications between the separate rails servicing the two banks. For a V8 configuration, there are two rails with four injectors attached to each rail. For a V6 configuration, there are also two rails, but with three injectors attached to each rail. For an inline (typically I6) configuration, there is only one rail with six injectors attached to it and there is no check valve at the actuating fluid flow inlet as no rail isolation is needed for a single rail configuration.

The actuating fluid rail preferably has a cylindrical shape and a generally cylindrical fluid passageway defined therein. The actuating fluid is able to flow freely in the fluid passageway with the least amount of flow restrictions between the locations where injectors are connected to the rail. For the V8 and V6 configuration, the two actuating fluid rails are both connected through actuating fluid flow passages to the high-pressure actuating fluid pump, but separated by the aforementioned check valves at the inlet of the respective rails. These check valves provide isolation between the two actuating fluid rails for limiting the pressure dynamics inside a one of the actuating fluid rail induced by the pressure dynamics in the other actuating fluid rail.

During normal engine operating conditions, the injectors are actuated at evenly spaced times. When the injector is actuated for injection, the injector control valve opens for an interval and then closes providing the necessary amount of actuating fluid for the injection event in the interval. For an injection event that comprises single shot operation, the injector control valve opens and closes once. For an injection event that includes pilot operation (a small pilot injection followed by a much larger main injection), the valve opens and closes twice or more. When the control valve opens and closes either for a single shot injection event or for a multiple shot injection event, it generates a considerable amount of dynamic disturbance in the actuating fluid in the actuating fluid rail.

First, during the opening period of the control valve, there is relatively large amount of actuating fluid flowing from the actuating fluid rail into the injector for injection actuation. This causes a pressure drop in the actuating fluid rail. This pressure drop is then recovered by the supply actuating fluid flow from the high-pressure pump. Second, the open and close of the injector control valve generates fluid pressure waves along the actuating fluid rail. This pressure wave propagates along the axial direction of the actuating fluid rail with a frequency primarily determined by the length of the actuating fluid rail and the bulk modulus of the actuating fluid.

Since the length if the rail is determined to a large extent by the engine configuration, the frequency varies depending on the engine configuration. For V8 and V6 configurations, the frequency is around 1000–2000 HZ; for I6 configuration, the frequency could be lower due to a longer rail, for example 800–1200 HZ. Because of this pressure wave, there is an unbalanced axial force on the actuating fluid rail since the pressure along the actuating fluid rail is different due to different time delay, or phase lag, at different locations along the actuating fluid rail. This unbalanced force has the same frequency as the pressure wave in the rail. The pressure wave interacts with the actuating fluid rail structure. A fraction of the pressure fluctuation energy converts to the undesirable air-borne acoustic energy. Also, the actuating fluid rail transmits an excitation with the above-mentioned frequency through the bolts connecting the rail to the rest of the engine. This excitation then generates an audible noise with the same range of the above noted frequency.

The audible noise resulting from the acoustic waves is objectionable. A goal might be that a compression ignition engine be no more noisy than a typical spark ignition engine. Such a level of noise is deemed to be generally acceptable. This is not presently the case, however. In order to meet this goal, a number of sources of noise from the compression ignition engine need to be addressed. As indicated above, one such source is the acoustic waves generated in the actuating fluid rail. There is then a need in the industry to attenuate the acoustic waves generated in the rail.

SUMMARY OF THE INVENTION

The present invention substantially meets the aforementioned needs of the industry. In order to attenuate the acoustic wave which is created due to the pressure fluctuations in the rail. The Acoustic Wave Attenuator (AWA) of the present invention provides the function of the acoustic energy absorption. When the linear dimensions of an acoustic system are small in comparison to the wavelength of the sound, the motion of the actuating fluid in the system is analogous to that of a mechanical system having lumped mechanical elements of mass, stiffness and damping. The AWA can be treated in terms of a mechanical oscillator. Such an attenuator consists of a rigid enclosed volume, communicating with the rail actuating fluid though a small orifice. When the acoustic wave impinges on the aperture of the orifice, the actuating fluid in the orifice will be set to vibrate which excites the actuating fluid within the enclosed volume of the AWA. The resulting amplified motion of the actuating fluid in the orifice, due to phase cancellation between the actuating fluid plug in the orifice and the actuating fluid volume in the enclosed cavity, causes energy absorption due to frictional drag in and around the orifice. This type of attenuator may be tuned to produce a maximum absorption over a certain desired frequency range.

The present invention is an actuator rail assembly for conveying an actuating fluid under pressure to at least one fuel injector, and includes an elongate fluid passageway being defined in a rail. A fluid inlet port is in fluid communication with the fluid passageway, the inlet port being fluidly couplable to a source of actuating fluid under pressure. A respective fluid outlet port is associated with each respective fuel injector and being fluidly couplable thereto for conveying actuating fluid to the respective fuel injector; and at least one fluid cavity having at least one throttling orifice, the orifice effecting fluid communication between the fluid cavity and the fluid passageway. An acoustic wave attenuator for a rail and a method of acoustic wave attenuation in a rail are also included in the present invention.

DETAILED DESCRIPTION OF THE DRAWINGS

Figure 1A:
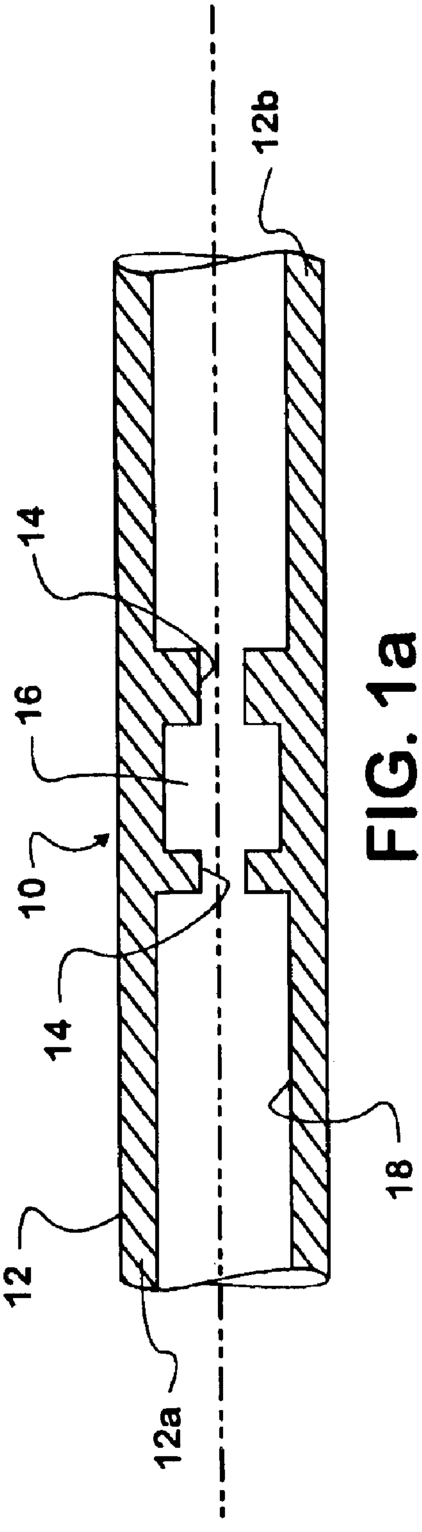
FIG. 1*a* is a first conceptual depiction of the acoustic wave attenuator of the present invention.
Figure 1B:
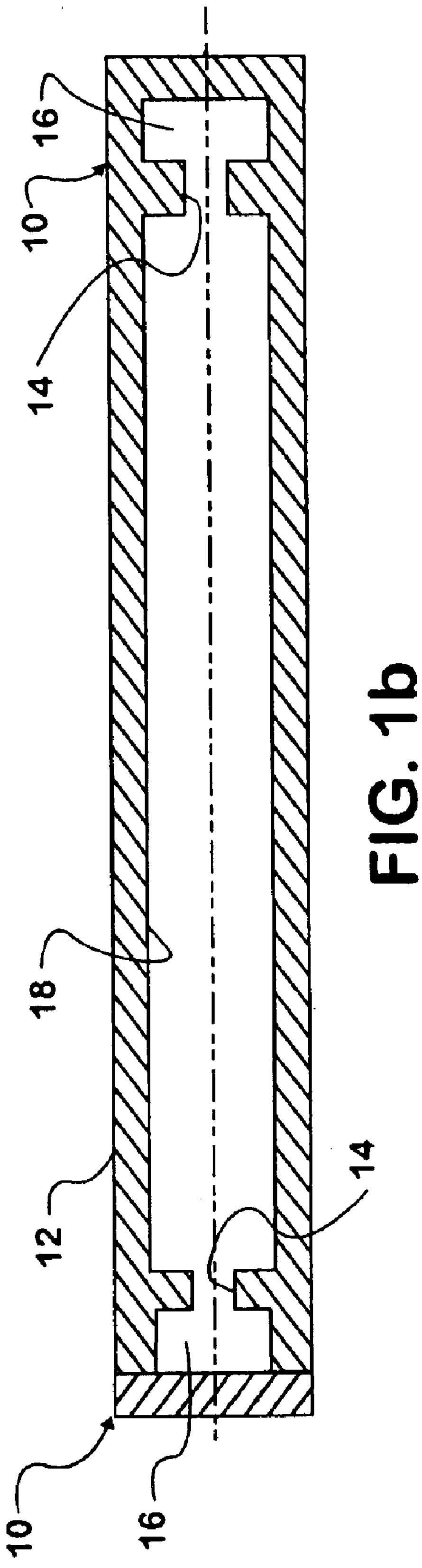
FIG. 1*b* is a second conceptual depiction of the acoustic wave attenuator of the present invention.

Referring to FIGS. 1*a* and 1*b*, the concept for the acoustic wave attenuator (AWA) of the present invention is shown. The AWA is shown generally at 10 in the conceptual depictions and is integrated with a high pressure actuating fluid rail 12. FIG. 1*a* shows a center AWA 10. For a V-8 configured engine, the AWA 10 is preferably disposed centrally with two fluid outlets ports (not shown) on either side of the AWA 10, each port servicing a fuel injector on the specific bank of cylinders. The AWA 10 has a cavity 16 and a pair of orifices 14, one orifice 14 fluidly coupling the cavity 16 to each of the two portions 12*a*, 12*b* of the rail 12.

FIG. 1*b* shows the rail 12 having two AWA's 10, the first AWA 10 being disposed proximate a first end of the rail 12 and the second AWA 10 being disposed proximate a second opposed end of the rail 12. Each AWA 10 has a cavity 16 that is fluidly coupled by an orifice 14 to the fluid passageway 18 defined in the rail 12. The rail 12 of the second depiction could be used with a V-6 configured engine or an inline 6 configured engine as desired. For the V-6 configuration, three ports would be spaced along the rail 12 between the AWA's 10, a port servicing each of the three injectors of the bank of the V-6 engine. For inline 6 configuration, six ports would be spaced along the span of the rail 12 between the AWA's 10 for servicing each of the six injectors.

A third configuration of the AWA 10 of the present invention would be to integrate the AWA 10 of the first figure with the AWA's 10 of the second figure to provide both a centrally disposed AWA 10 and end cap disposed AWA's 10.

The theory of the attenuation afforded by the AWA's 10 can be described by the equation $$f = \frac{C}{2\pi}\sqrt{\frac{A}{VL}}$$

where:

f equals the frequency of resonance;

C equals the velocity of sound in the medium (actuating fluid);

A equals the area of the orifice 14;

V equals the volume of the cavity 16; and

L equals the length dimension of the orifice 14 between the fluid passageway 18 and the cavity 16.

By introducing the AWA 10 of the present invention to the rail 12, the magnitude of the pressure wave is significantly reduced. Therefore, the axial force on the actuating fluid rail 12 is also significantly reduced. This reduction of force oscillation helps the reduction of noise with the frequency of the pressure wave in the actuating fluid rail 12. The flow restrictions (orifice 14) can be designed in such a way that they effectively attenuate the force oscillations on the actuating fluid rail 12 while maintaining the injector performance.

Figure 2:
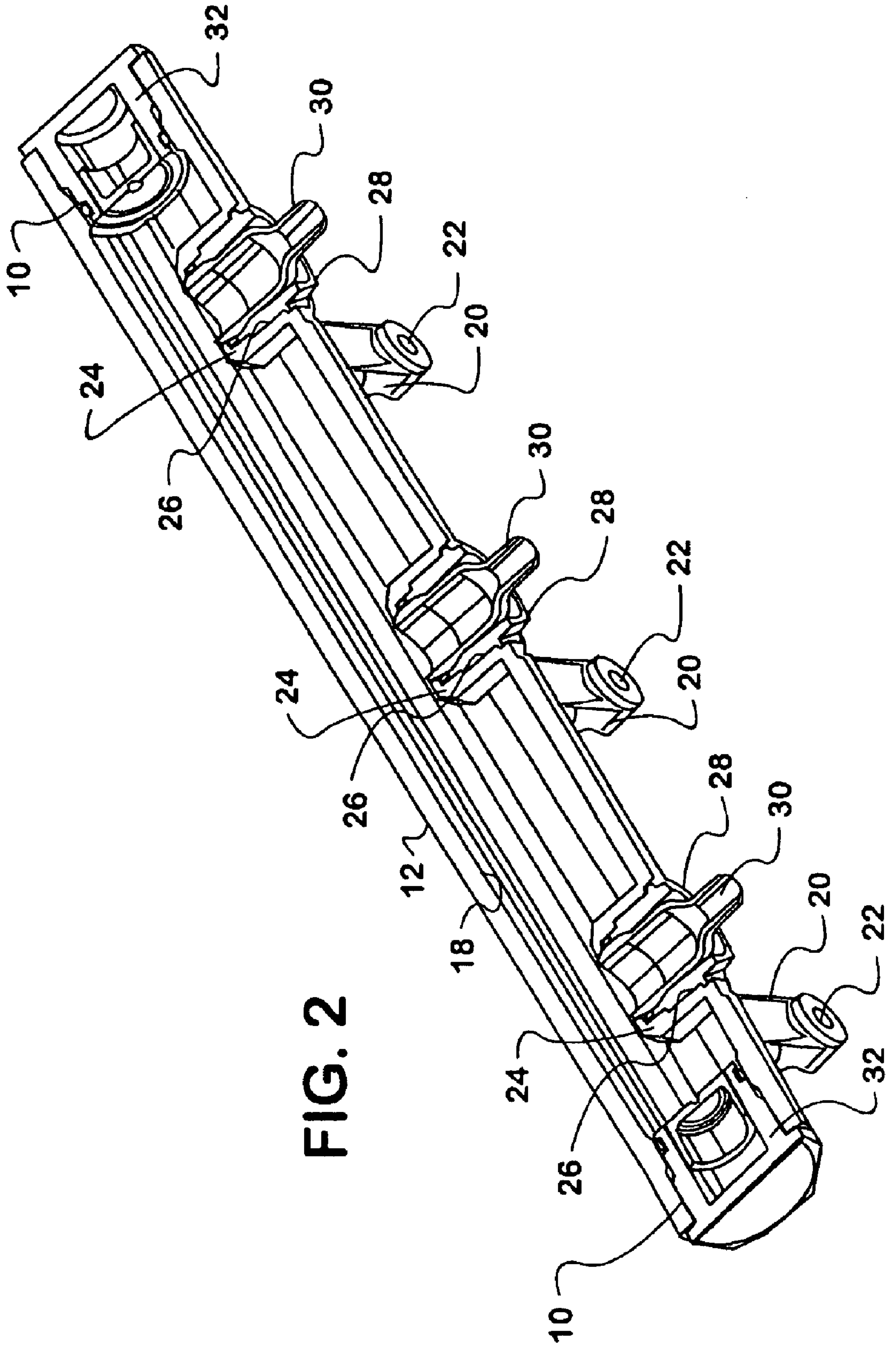
FIG. 2 is a sectional perspective view of a rail having acoustic wave attenuator end caps.
Figure 3:
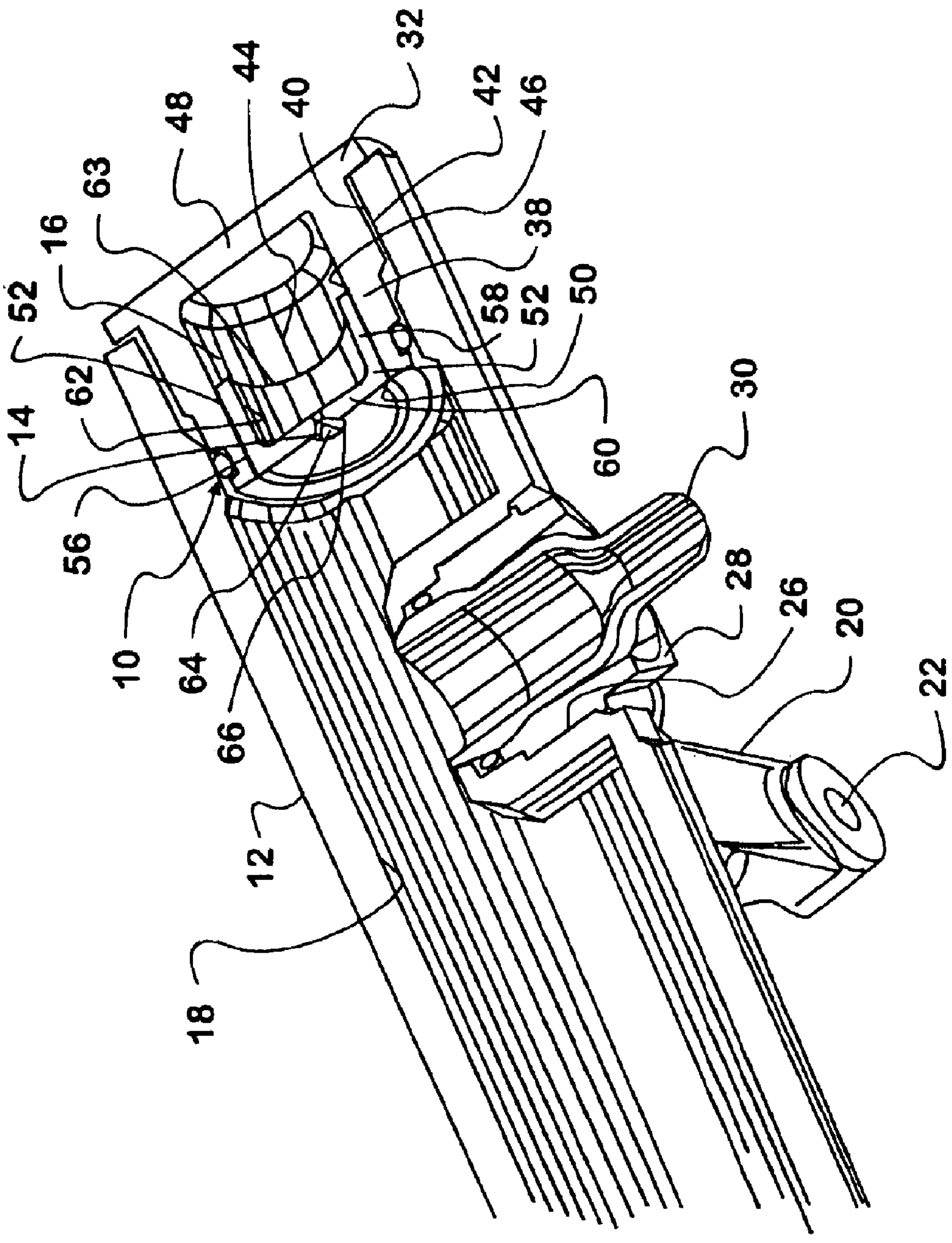
FIG. 3 is an enlarged sectional perspective view of an acoustic wave attenuator end cap of FIG. 2.

To achieve noise reduction in an embodiment in accordance with the teachings of of FIG. 1*b*, two Acoustic Wave Attenuators 10 were placed at the ends of the actuating fluid rail 12, as shown in FIGS. 2 and 3. This design eliminates the concerns of actuating fluid flow restriction through the actuating fluid rail (see the center AWA 10 in of FIG. 1*a*) since there are no additional flow restrictions in the rail 12 resulting from the integration of the AWA's 10 in the rail 12.

Referring to FIGS. 2 and 3, the rail 12 is generally cylindrical in shape. The rail 12 has a plurality of lugs 20 extending from the exterior margin of the rail 12. Each of the lugs 20 have a bore 22 defined therethrough for receiving a bolt for affixing the rail 12 to the head of the engine.

The rail 12 has a generally cylindrical fluid passageway 18 defined therein. A plurality of ports 24 intersect the fluid passageway 18. Each of the ports 24 is generally cylindrical in shape having a generally cylindrical inner margin 26. A ferrule 28 is threaded into the inner margin 26 and retains a jumper tube 30 therein. The jumper tube 30 fluidly connects the fluid passageway 18 to a respective fuel injector (not shown).

Figure 4:
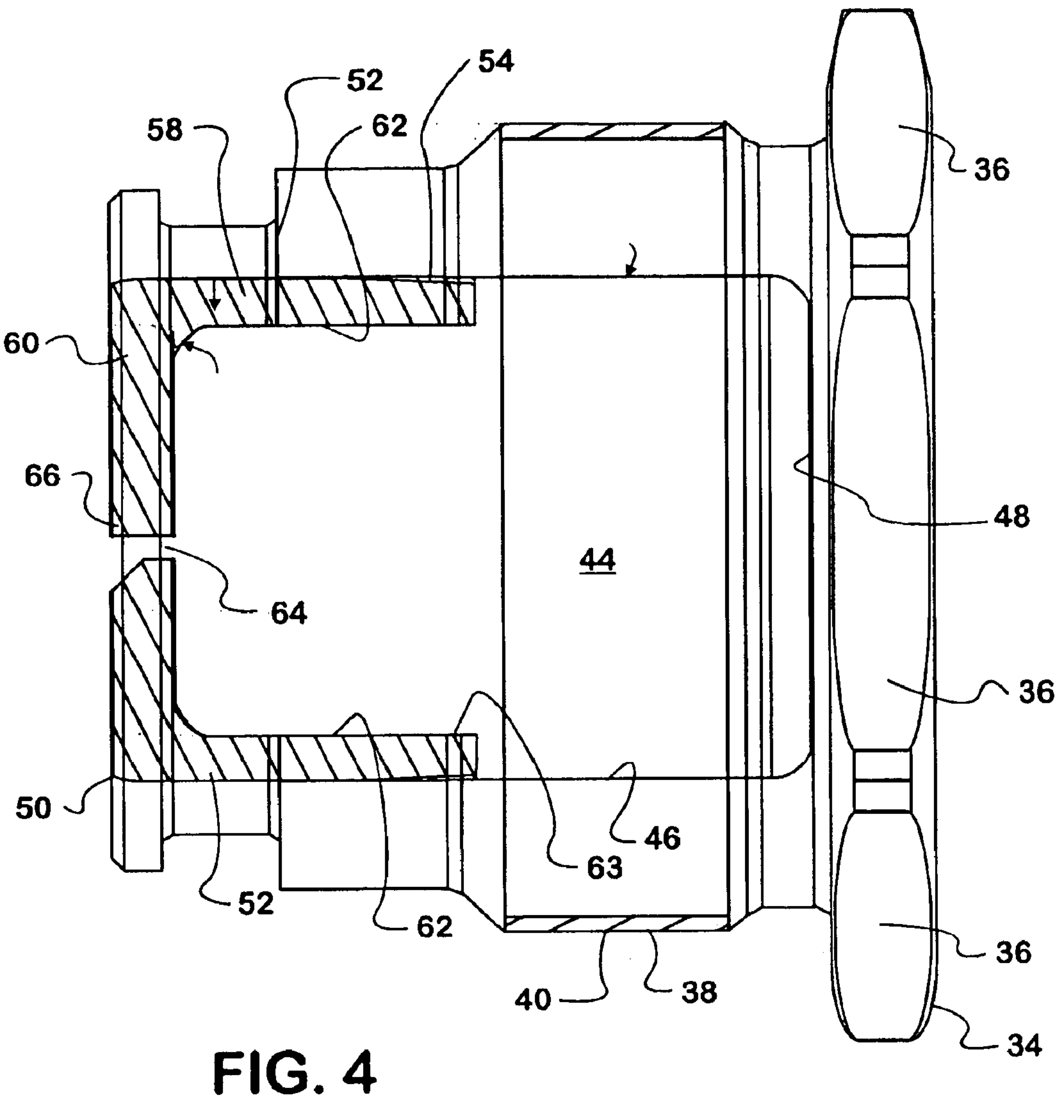
FIG. 4 is a side elevational view of an acoustic wave attenuator end cap with a portion broken away.

In the embodiment of FIGS. 2 and 3, the AWA's 10 each comprise an end cap 32 of the rail 12. The end cap 32 and its dimensions are depicted in FIG. 4. The end cap 32 that comprises the AWA 10 includes a hex nut 34 that has a plurality of flats 36 defined thereon to facilitate a wrench gaining purchase on the end cap 32.

The hex nut 34 is formed integral with the body 38 of the end cap 32. The body 38 has threads 40 defined on an exterior margin thereof. The threads 40 are designed to threadedly engage rail threads 42 (see FIG. 3) defined on an inside margin of the rail 12.

A cavity 44 is designed interior to the end cap 32. The cavity 44 has a generally cylindrical side margin 46. The side margin 46 preferably has a diameter of 15 to 25 millimeters and is preferably 20 millimeters. A circular end margin 48 seals a first end of the cavity 44. An aperture 50 is defined at the opposed second end of the cavity 44.

The cup shaped plug 52 is disposable in the aperture 50. When the plug 52 is disposed in the aperture 50, the plug 52 defines the second end of the cavity 44.

The plug 52 has a generally cylindrical outer margin that is defined by a tapered margin 54 and a straight margin 56.

The tapered margin 54 is preferably tapered between 2 and 5 degrees in order to facilitate inserting the plug 52 into the aperture 50. The straight margin 56 has a diameter that is very close to the diameter of the cavity 44 so that the plug 52 may be press fit into the aperture 50 or braised in the aperture 50.

The cup shaped plug 52 is formed of a plug sidewall 58 and a plug end wall 60. The plug sidewall 58 and plug end wall 60 form an interior cylindrical cavity 62. The cylindrical cavity 62 has a plug opening 63 that is opposed to the plug end wall 60. The cylindrical cavity 62 is in fluid communication with the cavity 44 by means of the plug opening 63. The cylindrical cavity 62 preferably has a 16 millimeter diameter. The plug sidewall 58 preferably has a 14 millimeter length extending from the outer margin of the plug end wall 60 to the plug opening 63.

An orifice 64 is preferably centrally defined through the plug end wall 60. A beveled inlet 66 is defined on the fluid passageway 18 side of the orifice 64. The beveling of the inlet 66 is preferably at a 45 degree angle relative to the plane of the plug end wall 60 and tapers down to the orifice 64 itself. The orifice 64 is preferably 0.7 millimeters in diameter and preferably has a length that corresponds to the thickness of the plug end wall 60 and is 2.5 millimeters. A plurality of orifices 64 could be so defined, each orifice 64 having a different area selected to be tuned to a certain frequency.

Figure 5:
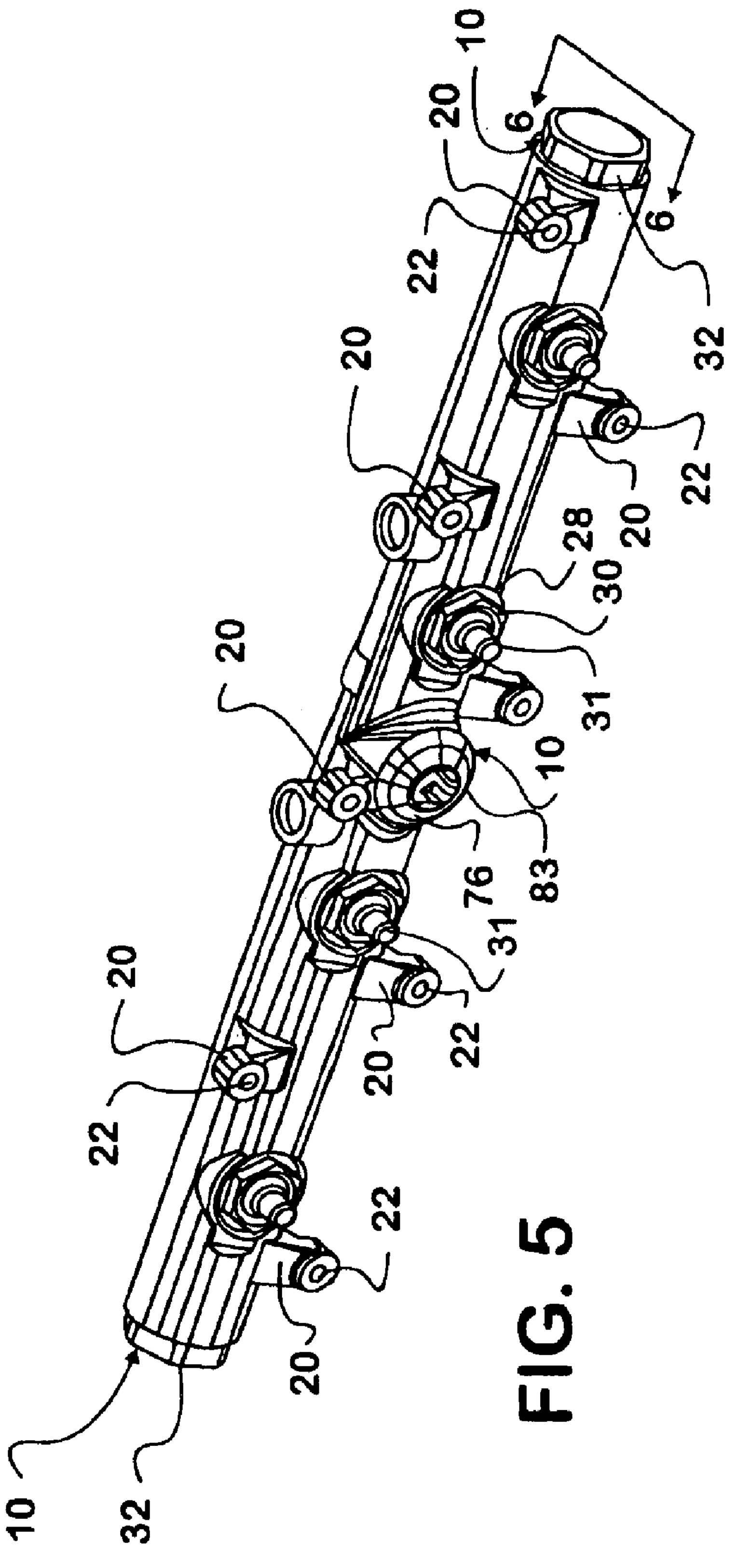
FIG. 5 is a perspective view of a rail having acoustic wave attenuator end caps and a center acoustic wave attenuator.
Figure 6:
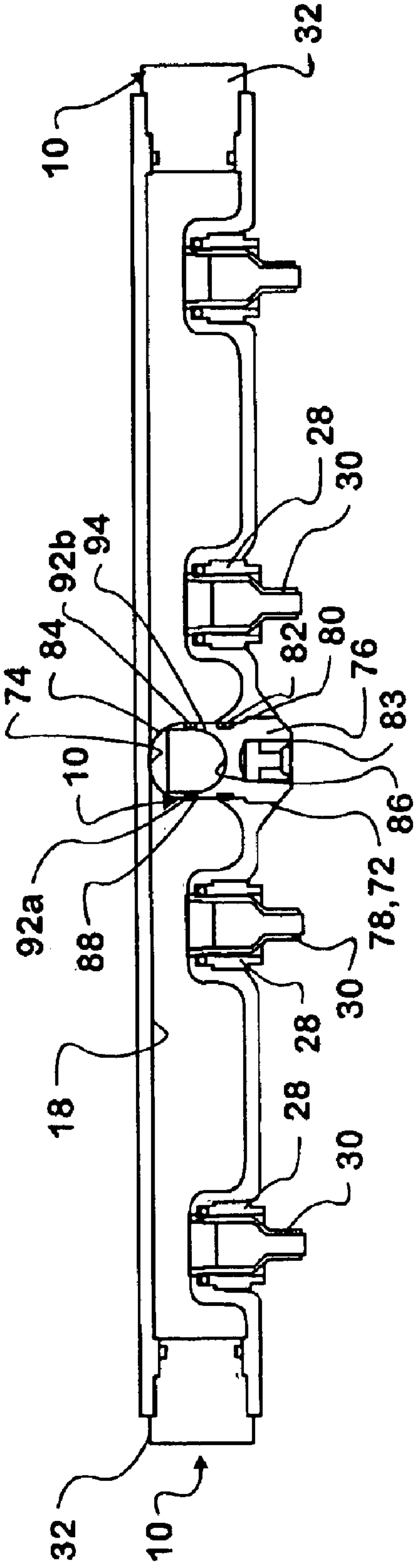
FIG. 6 is a sectional view of the rail taken along the line 6—6 of FIG. 5.
Figure 7:
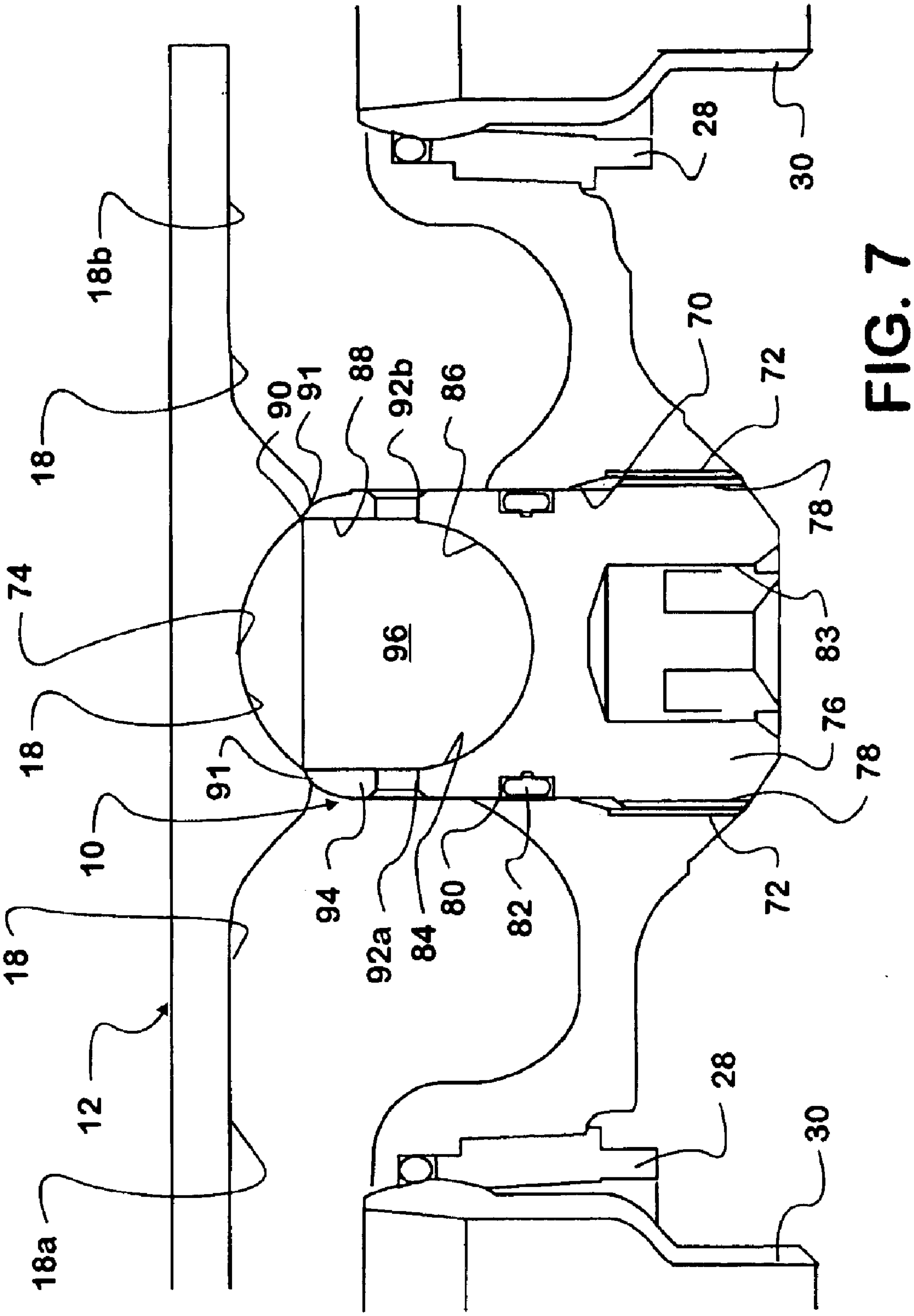
FIG. 7 is an enlarged sectional view of the center acoustic wave attenuator of FIG. 6.

FIGS. 5–7 depict a rail 12 for use with a V-8 configured engine. The rail 12 includes fluid inlet ports 31 for fluidly coupling the rail 12 to a high pressure actuating fluid pump. In practice one or the other of the inlet ports 31 is used depending on which bank of cylinders the particular rail 12 is servicing. Although not shown, similar inlet ports 31 are defined in the rail 12 of FIGS. 2 and 3.

The rail 12 includes end caps 32 forming a AWA's 10 as described above. Additionally, a center AWA 10 is disposed in the fluid passageway 18 approximately midway between the two end caps 32. In order to accommodate the AWA 10, a generally cylindrical aperture 70 is defined in the wall of the rail 12. A portion of the aperture 70 includes inside threads 72. The aperture 70 is formed generally opposite a hemispherical dome 74 that comprises a portion of the fluid passageway 18.

The AWA 10 includes a body 76. The body 76 has threads 78 defined on the outside margin thereof. The threads 78 are designed to threadedly engage the threads 72. A circumferential groove 80 is defined in the body 76. An O-ring seal 82 may be disposed in the groove 80 to define a fluid tight seal between the body 76 and the cylindrical aperture 70. A hex receiver 83 is formed in the body 76. An Allen type wrench may be inserted in the hex receiver 83 and the body 76 turned into the aperture 70.

A cavity 84 is defined in the body 76. The cavity 84 is generally hemispherical in shape. The cavity 84 is defined by the spherical portion 86 and the cylindrical portion 88. The cylindrical portion 88 is cylindrically shaped in order to facilitate the formation of the cavity 84. An opening 90 is defined at the upper margin of the body 76. When is body 76 is turned into the cylindrical aperture 70, a sealing engagement is defined between the upper margin of the body 70 and the periphery of the hemispherical dome 74 at seal 91. A pair of opposed orifices 92*a*, 92*b* are defined through the wall of the body 76. The orifices 92*a*, 92*b* have a length that is equal to the thickness of the wall 94. The orifices 92*a*, 92*b* fluidly couple the first portion 18*a* of the fluid passageway 18 with the second portion 18*b* of the fluid passageway 18. The orifices 92*a*, 92*b* preferably have the same area. A consideration in determining the area is to provide for adequate actuating fluid flow between first portion 18*a* and second portion 18*b*.

An attenuating cavity 96 is defined in part by the hemispherical dome 74 in cooperation with the cavity 84 defined in the body 76. The attenuating cavity 96 is generally spherical in shape with the exception of the portion of the attenuating cavity 96 that is defined by the cylindrical portion 88.

It will be obvious to those skilled in the art that other embodiments in addition to the ones described herein are indicated to be within the scope and breadth of the present application. Accordingly, the applicant intends to be limited only by the claims appended hereto.

What is claimed is:

1. An actuator rail assembly for conveying an actuating fluid under pressure to at least one fuel injector, comprising:

an elongate fluid passageway being defined in a rail;

a fluid inlet port being in fluid communication with the fluid passageway, the inlet port being fluidly couplable to a source of actuating fluid under pressure;

a respective fluid outlet port being associated with each respective fuel injector and being fluidly couplable thereto for conveying actuating fluid to the respective fuel injector; and at least one fluid cavity having at least one throttling orifice, the orifice effecting fluid communication between the fluid cavity and the fluid passageway, the orifice including an aperture, the aperture facing the fluid passageway and being beveled to define a dimensionally decreasing entrance to the orifice as the orifice is approached from the fluid passageway.

2. An acoustic wave attenuator end cap for an actuator rail assembly, the actuator rail assembly for conveying an actuating fluid under pressure to at least one fuel injector, comprising:

an end cap body having a resonating fluid cavity defined therein, the cavity having at least one throttling orifice, the orifice effecting fluid communication between the fluid cavity and the fluid passageway, the orifice including an aperture, the aperture facing the fluid passageway and being beveled to define a dimensionally decreasing entrance to the orifice as the orifice is approached from the fluid passageway; and a fluidly sealing engagement formable between the end cap body and an elongate fluid passageway defined in the rail.

* * * * *